United States Patent
Zhang et al.

(10) Patent No.: US 11,934,066 B2
(45) Date of Patent: Mar. 19, 2024

(54) DISPLAY DEVICE AND MANUFACTURING METHOD THEREOF, ELECTRONIC DEVICE, AND LIGHT CONTROL PANEL

(71) Applicants: HEFEI BOE DISPLAY TECHNOLOGY CO., LTD., Hefei (CN); BOE TECHNOLOGY GROUP CO., LTD., Beijing (CN)

(72) Inventors: Yuntian Zhang, Beijing (CN); Zhou Rui, Beijing (CN); Peng Jiang, Beijing (CN); Haipeng Yang, Beijing (CN); Chunxu Zhang, Beijing (CN); Zhonghou Wu, Beijing (CN); Li Tian, Beijing (CN); Ke Dai, Beijing (CN)

(73) Assignees: HEFEI BOE DISPLAY TECHNOLOGY CO., LTD., Hefei (CN); BOE TECHNOLOGY GROUP CO., LTD., Beijing (CN)

( * ) Notice: Subject to any disclaimer, the term of this patent is extended or adjusted under 35 U.S.C. 154(b) by 147 days.

(21) Appl. No.: 17/281,031

(22) PCT Filed: Oct. 14, 2020

(86) PCT No.: PCT/CN2020/120848
§ 371 (c)(1),
(2) Date: Mar. 29, 2021

(87) PCT Pub. No.: WO2021/082914
PCT Pub. Date: May 6, 2021

(65) Prior Publication Data
US 2022/0308397 A1    Sep. 29, 2022

(30) Foreign Application Priority Data

Oct. 31, 2019 (CN) .......................... 201911056268.6

(51) Int. Cl.
*G02F 1/13357* (2006.01)
*G02F 1/1335* (2006.01)
*G09G 3/36* (2006.01)

(52) U.S. Cl.
CPC .. *G02F 1/133606* (2013.01); *G02F 1/133512* (2013.01); *G09G 3/3677* (2013.01);
(Continued)

(58) Field of Classification Search
CPC .............. G02F 1/1347; G02F 1/13476; G02F 1/133602; G09G 2300/023
See application file for complete search history.

(56) References Cited

U.S. PATENT DOCUMENTS

2017/0351152 A1   12/2017   Hashiguchi et al.
2018/0081229 A1   3/2018    Ono
(Continued)

FOREIGN PATENT DOCUMENTS

CN   109478387 A   3/2019
CN   111061098 A   4/2020
(Continued)

OTHER PUBLICATIONS

European Office Action issued by the European Patent Office in European Application No. 20878032.0; dated Jan. 23, 2024.

*Primary Examiner* — Angela K Davison
(74) *Attorney, Agent, or Firm* — Dilworth & Barrese, LLP.; Michael J. Musella, Esq.

(57) ABSTRACT

A display device and a manufacturing method thereof, an electronic device, and a light control panel are provided. The display device includes a light control panel and a display liquid crystal panel. The display liquid crystal panel is on a light-emitting side of the light control panel; the light control panel includes a light control region, and the light control region is configured to provide adjusted backlight to the
(Continued)

display liquid crystal panel; the display liquid crystal panel includes a display region, and the display region is configured to receive the adjusted backlight to perform display; and a distance between two opposite edges of the light control region in at least one direction is greater than a distance between two opposite edges of the display region in the at least one direction.

19 Claims, 5 Drawing Sheets

(52) U.S. Cl.
CPC ............... *G09G 2300/0426* (2013.01); *G09G 2310/0286* (2013.01); *G09G 2310/061* (2013.01)

(56) References Cited

U.S. PATENT DOCUMENTS

| | | | |
|---|---|---|---|
| 2018/0114506 A1* | 4/2018 | Takahashi | G06F 3/0443 |
| 2019/0147812 A1 | 5/2019 | Koudo et al. | |
| 2020/0117032 A1* | 4/2020 | Chan | G02F 1/133528 |

FOREIGN PATENT DOCUMENTS

| | | |
|---|---|---|
| CN | 210428032 U | 4/2020 |
| CN | 111240110 A | 6/2020 |
| JP | 2008304540 A | 12/2008 |

* cited by examiner

DISPLAY DEVICE AND MANUFACTURING METHOD THEREOF, ELECTRONIC DEVICE, AND LIGHT CONTROL PANEL The present application claims the priority of Chinese patent application No. 201911056268.6, filed on Oct. 31, 2019, and the entire disclosure of which is incorporated herein by reference as part of the disclosure of this application.

TECHNICAL FIELD

Embodiments of the present disclosure relate to a display device and a manufacturing method thereof, an electronic device, and a light control panel.

BACKGROUND

With continuous development of display technology, users put forward higher and higher requirements for contrast, brightness uniformity, and the like of liquid crystal display devices. At present, in order to better control the intensity of light transmitted through liquid crystal molecules in the liquid crystal layer of the display panel, a light control panel may be provided between the display panel and the backlight module of the liquid crystal display device. The light control panel can adjust the emitting angle, intensity, and the like of backlight provided by the backlight module, and provide the adjusted backlight to the display panel for performing display operations.

SUMMARY

At least one embodiment of the present disclosure provides a display device, and the display device comprises a light control panel and a display liquid crystal panel; the display liquid crystal panel is on a light-emitting side of the light control panel; the light control panel comprises a light control region, and the light control region is configured to provide adjusted backlight to the display liquid crystal panel; the display liquid crystal panel comprises a display region, and the display region is configured to receive the adjusted backlight to perform display; and a distance between two opposite edges of the light control region in at least one direction is greater than a distance between two opposite edges of the display region in the at least one direction.

For example, in the display device provided by at least one embodiment of the present disclosure, an orthographic projection of the display region of the display liquid crystal panel on the light control panel is within the light control region of the light control panel.

For example, in the display device provided by at least one embodiment of the present disclosure, a difference between the distance between the two opposite edges of the light control region in the at least one direction and the distance between the two opposite edges of the display region in the at least one direction is a predetermined distance; and a value of the predetermined distance is greater than or equal to twice an absolute value of a maximum bonding tolerance of the display liquid crystal panel and the light control panel in the at least one direction.

For example, in the display device provided by at least one embodiment of the present disclosure, the at least one direction comprises a first direction and a second direction, and the first direction is different from the second direction; a difference between a distance between two opposite first display edges of the display region in the first direction and a distance between two opposite first light control edges of the light control region in the first direction is a first predetermined distance, and a value of the first predetermined distance is greater than or equal to twice an absolute value of a maximum bonding tolerance of the display liquid crystal panel and the light control panel in the first direction; and a difference between a distance between two opposite second display edges of the display region in the second direction and a distance between two opposite second light control edges of the light control region in the second direction is a second predetermined distance, and a value of the second predetermined distance is greater than or equal to twice an absolute value of a maximum bonding tolerance of the display liquid crystal panel and the light control panel in the second direction.

For example, in the display device provided by at least one embodiment of the present disclosure, the display region comprises a plurality of display pixel units arranged in an array, and the absolute value of the maximum bonding tolerance of the display liquid crystal panel and the light control panel in the at least one direction is smaller than a size of each of the display pixel units in the at least one direction.

For example, in the display device provided by at least one embodiment of the present disclosure, a difference between the distance between the two opposite edges of the light control region in the at least one direction and the distance between the two opposite edges of the display region in the at least one direction is a predetermined distance; and the display region comprises a plurality of display pixel units arranged in an array, and a value of the predetermined distance is greater than or equal to a size of each of the display pixel units in the at least one direction.

For example, in the display device provided by at least one embodiment of the present disclosure, the display liquid crystal panel further comprises a first light-shielding region around the display region, and an orthographic projection of the first light-shielding region on the light control panel at least partially overlaps with the light control region of the light control panel in the at least one direction.

For example, in the display device provided by at least one embodiment of the present disclosure, the light control panel comprises a light control pixel array, the light control pixel array is configured to adjust backlight emitted into the light control panel, so as to allow the light control panel to provide the adjusted backlight to the display liquid crystal panel, and the light control pixel array is at least in the light control region.

For example, in the display device provided by at least one embodiment of the present disclosure, the light control panel further comprises a second light-shielding region around the light control region, and the light control pixel array comprises a plurality of light control pixel units arranged in an array; and the second light-shielding region at least partially shields the light control pixel unit at opposite edges of the light control pixel array in the at least one direction.

For example, in the display device provided by at least one embodiment of the present disclosure, the light control panel further comprises a first gate driving circuit; the first gate driving circuit is in the second light-shielding region and on at least one side of the light control region; the first gate driving circuit comprises a plurality of cascaded first shift register units, and the plurality of first shift register units are electrically connected to a plurality of rows of light control pixel units in the light control pixel array, respectively, so as to provide a first gate driving signal; and each of the first shift register units comprises a first transistor, and the first transistor comprises a plurality of active layers arranged side by side.

For example, in the display device provided by at least one embodiment of the present disclosure, the each of the first shift register units comprises an input circuit, an output circuit, and an output reset circuit; the input circuit is electrically connected to a first node and is configured to write an input signal to the first node in response to the input signal, so as to control a level of the first node; the output circuit is electrically connected to the first node and an output terminal, and is configured to receive a clock signal and output the clock signal to the output terminal as the first gate driving signal under control of the level of the first node; the output reset circuit is electrically connected to the output terminal and is configured to reset the output terminal in response to a reset signal; and the output circuit comprises the first transistor.

For example, in the display device provided by at least one embodiment of the present disclosure, the output reset circuit comprises a second transistor, and the second transistor comprises a plurality of active layers arranged side by side.

For example, in the display device provided by at least one embodiment of the present disclosure, a gate electrode of the first transistor is connected to the first node, a first electrode of the first transistor is connected to a clock signal terminal to receive the clock signal, and a second electrode of the first transistor is connected to the output terminal; and a gate electrode of the second transistor is connected to a reset terminal to receive the reset signal, a first electrode of the second transistor is connected to the output terminal, and a second electrode of the second transistor is connected to a first voltage terminal.

For example, in the display device provided by at least one embodiment of the present disclosure, the display liquid crystal panel further comprises a second gate driving circuit; the second gate driving circuit is in the first light-shielding region and on at least one side of the display region; the second gate driving circuit comprises a plurality of cascaded second shift register units, and the plurality of second shift register units are electrically connected to a plurality of rows of display pixel units in the display region, respectively, so as to provide a second gate driving signal; and transistors comprised in the each of the first shift register units are more than transistors comprised in each of the second shift register units.

For example, in the display device provided by at least one embodiment of the present disclosure, in an arrangement direction of the plurality of active layers of the first transistor, a size occupied by the each of the first shift register units is smaller than a row height of one row of light control pixel units; and one first shift register unit is electrically connected to a corresponding row of light control pixel units through a signal line, and the signal line is of a zigzag line type.

For example, in the display device provided by at least one embodiment of the present disclosure, the light control pixel array is in the light control region; the light control pixel array comprises an edge light control pixel unit and a middle light control pixel unit; the edge light control pixel unit is provided along an edge of the light control region and surrounds the middle light control pixel unit; and a size of the edge light control pixel unit is different from a size of the middle light control pixel unit in at least one direction.

For example, the display device provided by at least one embodiment of the present disclosure further comprises a backlight source, the backlight source is on a side of the light control panel away from the display liquid crystal panel and is configured to provide initial backlight to the light control panel, and the light control panel is configured to adjust the initial backlight to obtain the adjusted backlight.

At least one embodiment of the present disclosure further provides an electronic device, and the electronic device comprises the display device provided by any one of the embodiments of the present disclosure.

At least one embodiment of the present disclosure further provides a manufacturing method of a display device, and the manufacturing method comprises: providing a light control panel and a display liquid crystal panel, where the light control panel comprises a light control region, the light control region is configured to provide adjusted backlight to the display liquid crystal panel, the display liquid crystal panel comprises a display region, the display region is configured to receive the adjusted backlight to perform display, and a distance between two opposite edges of the light control region in at least one direction is greater than a distance between two opposite edges of the display region in the at least one direction; and aligning and bonding the light control panel and the display liquid crystal panel, where the display liquid crystal panel is on a light-emitting side of the light control panel.

For example, in the manufacturing method provided by at least one embodiment of the present disclosure, aligning and bonding the light control panel and the display liquid crystal panel, comprises: allowing an orthographic projection of the display region of the display liquid crystal panel on the light control panel to be located within the light control region of the light control panel.

For example, in the manufacturing method provided by at least one embodiment of the present disclosure, a difference between the distance between the two opposite edges of the light control region in the at least one direction and the distance between the two opposite edges of the display region in the at least one direction is a predetermined distance; and a value of the predetermined distance is greater than or equal to twice an absolute value of a maximum bonding tolerance of aligning and bonding the display liquid crystal panel and the light control panel in the at least one direction.

At least one embodiment of the present disclosure further provides a light control panel, and the light control panel comprises a light control region; the light control panel is configured to provide adjusted backlight to a display liquid crystal panel on a light-emitting side of the light control panel; the display liquid crystal panel comprises a display region, and the display region is configured to receive the adjusted backlight to perform display; and a distance between two opposite edges of the light control region in at least one direction is greater than a distance between two opposite edges of the display region in the at least one direction.

For example, in the light control panel provided by at least one embodiment of the present disclosure, a difference between the distance between the two opposite edges of the light control region in the at least one direction and the distance between the two opposite edges of the display region in the at least one direction is a predetermined distance; and a value of the predetermined distance is greater than or equal to twice an absolute value of a maximum bonding tolerance of the display liquid crystal panel and the light control panel in the at least one direction.

For example, in the light control panel provided by at least one embodiment of the present disclosure, a distance between two opposite edges of the light control region in any direction is greater than a distance between two opposite edges of the display region in the any direction.

BRIEF DESCRIPTION OF THE DRAWINGS

In order to clearly illustrate the technical solutions of the embodiments of the present disclosure, the drawings of the embodiments will be briefly described in the following. It is obvious that the described drawings are only related to some embodiments of the present disclosure and thus are not limitative to the present disclosure.

DETAILED DESCRIPTION

Figure 1A:
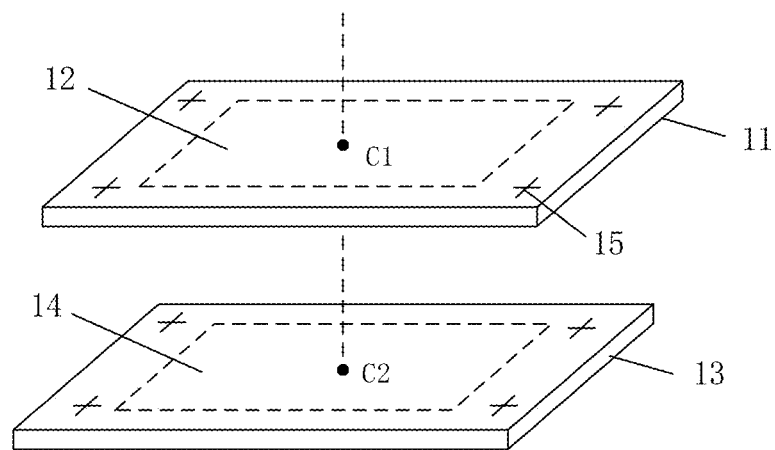
FIG. 1A is a schematic diagram of aligning and bonding a display liquid crystal panel and a light control liquid crystal panel.

In order to make objects, technical details and advantages of the embodiments of the present disclosure apparent, the technical solutions of the embodiments of the present disclosure will be described in a clearly and fully understandable way in connection with the drawings related to the embodiments of the present disclosure. Apparently, the described embodiments are just a part but not all of the embodiments of the present disclosure. Based on the described embodiments of the present disclosure herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects.

At present, by providing a light control panel between a display liquid crystal panel and a backlight module of a liquid crystal display device, brightness of backlight provided to the display liquid crystal panel can be independently controlled corresponding to different regions. For example, the light control panel is usually a light control liquid crystal panel, and the brightness of the backlight provided to the display liquid crystal panel can be adjusted by adjusting the deflection angle of liquid crystal molecules in the liquid crystal layer of the light control liquid crystal panel. For example, by adjusting the deflection angle of liquid crystal molecules in the light control liquid crystal panel, the brightness of the backlight provided to the part, corresponding to the dark state region of the display image, of the display liquid crystal panel may be reduced, so as to reduce the intensity of transmitted light of the dark state region of the display image, thereby avoiding or alleviating the light leakage phenomenon of the dark state region in the liquid crystal display device.

Generally, the display liquid crystal panel and light control liquid crystal panel in the liquid crystal display device have the same appearance size and the same functional size. For example, the display liquid crystal panel and the light control liquid crystal panel are identical in shape and size, and the display region in the display liquid crystal panel and the light control region in the light control liquid crystal panel are identical in shape and size, so that the light control region can correspond to the display region after the display liquid crystal panel and the light control liquid crystal panel are aligned and bonded, and the backlight emitted by the backlight module can be provided to the display region after being regulated by the light control region.

FIG. 1A is a schematic diagram of aligning and bonding a display liquid crystal panel and a light control liquid crystal panel. For example, as illustrated in FIG. 1A, the display liquid crystal panel 11 includes a display region 12, the light control liquid crystal panel 13 includes a light control region 14, and the display region 12 and the light control region 14 have the same shape and the same size (i.e., the size in each direction on the plane (e.g., a horizontal plane) parallel to the display region 12 and the light control region 14 in the figure).

For example, as illustrated in FIG. 1A, both the display liquid crystal panel 11 and the light control liquid crystal panel 13 are provided with a plurality of corresponding alignment marks 15, which are used for alignment in the process of bonding the display liquid crystal panel 11 and the light control liquid crystal panel 13, so as to align a center C1 of the display region 12 with a center C2 of the light control region 14 and further align side edges of the display region 12 and side edges of the light control region 14 in various directions on the horizontal plane. For example, after the display liquid crystal panel 11 and the light control liquid crystal panel 13 are aligned according to the corresponding alignment marks 15, the connecting line between the center C1 of the display region 12 and the center C2 of the light control region 14 is perpendicular to a main surface of the display liquid crystal panel 11 and a main surface of the light control liquid crystal panel 13, and orthographic projections of the side edges of the display region 12 on the main surface of the display liquid crystal panel 11 (or on the main surface of the light control liquid crystal panel 13) correspondingly overlap with orthographic projections of the side edges of the light control region 14 in various directions on the horizontal plane on the main surface of the display liquid crystal panel 11 (or on the main surface of the light control liquid crystal panel 13). Therefore, after the display liquid crystal panel 11 and the light control liquid crystal panel 13 are bonded, the orthographic projection of the center C2 of the light control region 14 on the display liquid crystal panel 11 may coincide with the center C1 of the display region 12, so that the orthographic projection of the light control region 14 on the display liquid crystal panel 11 coincides with the display region 12, so as to allow the brightness of the backlight received by the display region 12 to be adjusted through the light control region 14.

However, in the process of aligning and bonding the display liquid crystal panel 11 and the light control liquid crystal panel 13, due to the influence of equipment precision, process precision, or the like, there is often a bonding deviation between the display liquid crystal panel 11 and the light control liquid crystal panel 13, and therefore in the liquid crystal display device actually prepared, there is a deviation between the light control region 14 and the display region 12 in the plane parallel to the light control region 14 and the display region 12. The alignment marks in the figure are cross-shaped, but the present disclosure does not limit to this case, and various appropriate alignment marks may be adopted in the embodiments of the present disclosure.

Figure 1B:
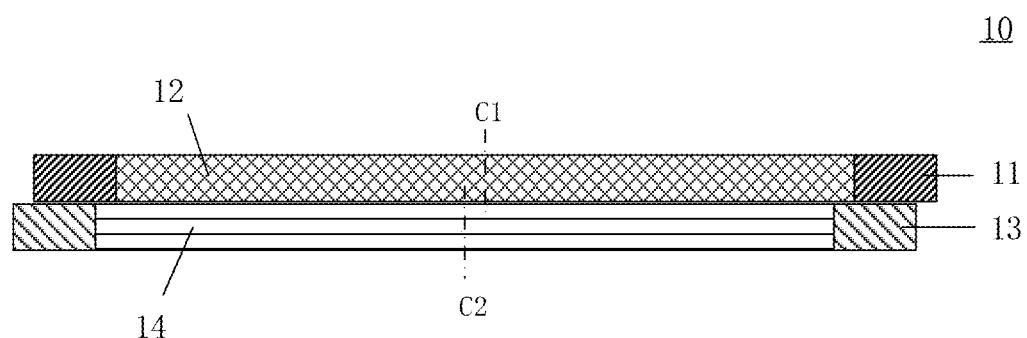
FIG. 1B is a schematic structural diagram of a liquid crystal display device.

For example, as illustrated in FIG. 1B, in the liquid crystal display device 10 formed by bonding the display liquid crystal panel 11 and the light control liquid crystal panel 13, due to the influence of bonding deviation, the orthographic projection of the center C2 of the light control region 14 on the display liquid crystal panel 11 does not completely coincide with the center C1 of the display region 12, and the orthographic projection of the light control region 14 on the display liquid crystal panel 11 can only overlap with a part of the display region 12, that is, in the direction perpendicular to the main surface of the display liquid crystal panel 11 (or the light control liquid crystal panel 13), part of the display region 12 does not overlap with the light control region 14, which results in that this part of the display region 12, which does not overlap with the light control region 14, cannot receive the backlight adjusted by the light control region 14 to perform display operations, or only can receive backlight with lower brightness than expected, thus reducing the area of the actual display region of the liquid crystal display device 10 and resulting in the loss of the area of display region. Therefore, in the liquid crystal display device 10, due to the loss of the area of the display region, the display image is partially missing, which is difficult to provide a complete display image, thereby seriously reducing the display quality and display effect of the display image and greatly reducing the reliability and stability of the product.

At least one embodiment of the present disclosure provides a display device, and the display device can reduce or avoid the loss of the area of the display region in the display device by optimizing the size design of the light control panel, and can further improve the display effect and display quality of the display image on the basis of improving the contrast of the display image provided by the display device through the light control panel, so as to improve the reliability and stability of the product and enable users to obtain better viewing experience.

At least one embodiment of the present disclosure provides a display device, and the display device includes a light control panel and a display liquid crystal panel. The display liquid crystal panel is located on a light-emitting side of the light control panel. The light control panel includes a light control region, and the light control region is configured to provide adjusted backlight to the display liquid crystal panel. The display liquid crystal panel includes a display region, and the display region is configured to receive the adjusted backlight to perform display. A distance between two opposite edges of the light control region in at least one direction is greater than a distance between two opposite edges of the display region in the at least one direction.

Because the distance between the two opposite edges of the light control region in the at least one direction is greater than the distance between the two opposite edges of the display region in that direction, a width of the light control region in the at least one direction is greater than a width of the display region in that direction, so that after the light control panel and the display liquid crystal panel are aligned and bonded, the area loss of the actual display region of the display device caused by bonding deviation can be reduced or avoided in the at least one direction. Therefore, the brightness of the display image provided by the display device can be controlled more effectively through the light control panel to improve the contrast of the display image, and at the same time, the completeness and accuracy of the display image provided by the display device can be improved, thereby improving the overall display effect and display quality of the display image, improving the reliability and stability of the product, and enabling users to obtain better viewing experience.

In the display device provided by some embodiments of the present disclosure, by allowing the distance between the two opposite edges of the light control region in the at least one direction to be greater than the distance between the two opposite edges of the display region in that direction, an orthographic projection of the display region of the display liquid crystal panel on the light control panel can be located in the light control region of the light control panel in the at least one direction, thereby avoiding the area loss of the actual display region of the display device caused by the bonding deviation, ensuring the integrity and accuracy of the display image provided by the display device, apparently improving the display effect and display quality of the display image, and further improving the reliability and stability of the product.

Hereinafter, some embodiments of the present disclosure are described in detail with reference to the accompany drawings. It should be noted that the same reference numerals in different drawings are used to refer to the same described elements.

Figure 2:
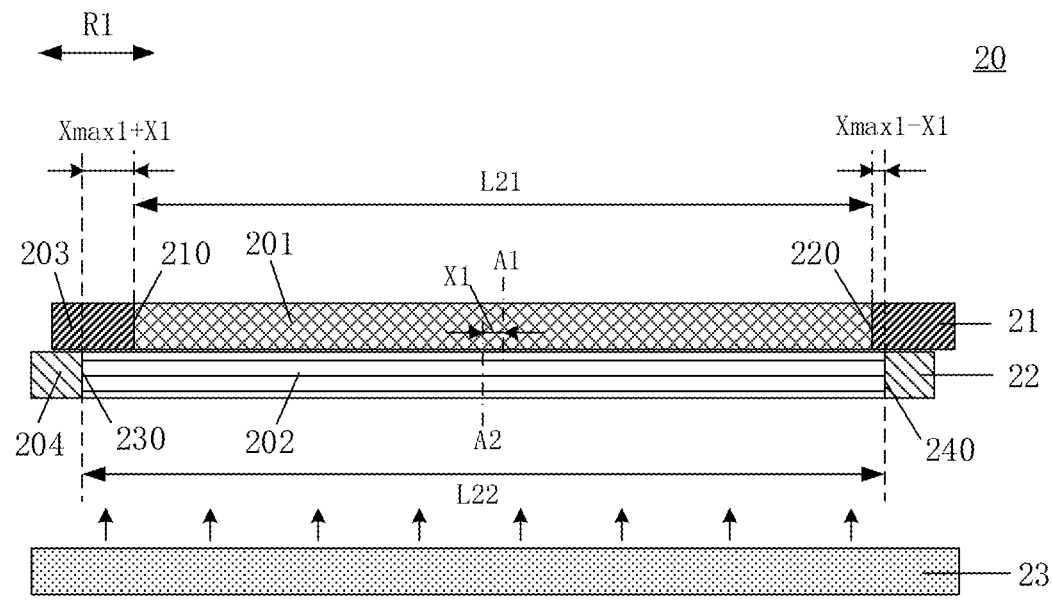
FIG. 2 is a schematic structural diagram of a display device provided by some embodiments of the present disclosure.

FIG. 2 is a schematic structural diagram of a display device provided by some embodiments of the present disclosure, for example, a schematic diagram of a cross-sectional structure of a display device 20 along a first direction R1.

For example, as illustrated in FIG. 2, the display device 20 includes a display liquid crystal panel 21 and a light control panel 22, and the display liquid crystal panel 21 is located on a light-emitting side of the light control panel 22. The light control panel 22 includes a light control region 202, and the light control region 202 is configured to provide adjusted backlight to the display liquid crystal panel 21. The display liquid crystal panel 21 includes a display region 201, and the display region 201 is configured to receive the adjusted backlight to perform display. A distance L22 between two opposite edges 230 and 240 of the light control region 202 in the first direction R1 is greater than a distance L21 between two opposite edges 210 and 220 of the display region 201 in the first direction RE The first direction R1 may be any direction in the plane where the display liquid crystal panel 21 (or the light control panel 22) is located. For example, in the case where the display region of the display liquid crystal panel 21 is rectangular, the first direction R1 may be a long side direction, a short side direction, a diagonal direction, or the like of the rectangle.

The difference between the distance L22 (i.e., a width L22 of the light control region 202 in the first direction R1) between the two opposite edges 230 and 240 of the light control region 202 in the first direction R1 and the distance L21 (i.e., a width L21 of the display region 201 in the first direction R1) between the two opposite edges 210 and 220 of the display region 201 in the first direction R1 is greater than zero, so that the area loss of the actual display region of the display device 20 due to the bonding deviation can be reduced or avoided at least in the first direction R1.

For example, in at least one example of the embodiment illustrated in FIG. 2, the difference between the distance L22, which is between the two opposite edges 230 and 240 of the light control region 202 in the first direction R1, and the distance L21, which is between the two opposite edges 210 and 220 of the display region 201 in the first direction R1, is a predetermined distance, and a value of the predetermined distance is equal to twice an absolute value Xmax1 of a maximum bonding tolerance of the display liquid crystal panel 21 and the light control panel 22 in the first direction R1 in the case where the display liquid crystal panel 21 and the light control panel 22 are bonded, that is, the value of the predetermined distance is 2*Xmax1.

It should be noted that the above-mentioned bonding tolerance refers to a range of allowable deviation due to reasons, such as equipment precision, process precision, or the like, in the case where the display liquid crystal panel 21 and the light control panel 22 are aligned and bonded according to alignment marks (not shown). For example, the bonding tolerance in the first direction R1 is a range of deviation between the display liquid crystal panel 21 and the light control panel 22 in the first direction R1; and compared with the completely aligned state, the range of deviation is −Xmax1 to +Xmax1. For example, the range of deviation may also be understood as the deviation between the orthographic projection of the center A2 of the light control region 202 on the display liquid crystal panel 21 and the center A1 of the display region 201.

For example, the specific value range of the bonding tolerance may be determined according to the size specifications of the display liquid crystal panel 21 and the light control panel 22, the bonding equipment used, the bonding process used, different actual operating environments, etc. The range of the bonding tolerance needs to cover the maximum deviation that may occur due to errors in the aspect, such as equipment precision, process precision, or the like, in the case where the display liquid crystal panel 21 and the light control panel 22 are aligned and bonded. That is, the range of the bonding tolerance needs to cover the maximum deviation which may occur between the orthographic projection of the center A2 of the light control region 202 on the display liquid crystal panel 21 and the center A1 of the display region 201.

For example, as illustrated in FIG. 2, in the case where there is a deviation between the display liquid crystal panel 21 and the light control panel 22 in the display device 10 after the display liquid crystal panel 21 and the light control panel 22 are bonded and the deviation in the first direction R1 is X1, that is, in the case where the deviation between the orthographic projection of the center A2 of the light control region 202 on the display liquid crystal panel 21 and the center A1 of the display region 201 is X1, the width L22 of the light control region 202 in the first direction R1 is greater than the width L21 of the display region 201 in the first direction R1 and the difference between the width L22 and the width L21 is 2*Xmax1, and therefore, in the display device 20, the distance between the orthographic projection of the edge 210 of the display region 201 on the light control panel 22 and the adjacent edge 230 of the light control region 202 is Xmax1+X1, and the distance between the orthographic projection of the edge 220 of the display region 201 on the light control panel 22 and the adjacent edge 240 of the light control region 202 is Xmax1−X1. Because Xmax1≥X1, the orthographic projection of the display region 201 on the light control panel 22 can be located within the light control region 202 in the first direction R1, that is, the width of the actual display region of the display device 20 in the first direction R1 is equal to the width of the display region 201 in the first direction R1, thereby avoiding the area loss of the actual display region of the display device 20 due to the bonding deviation in the first direction R1 and improving the integrity and accuracy of the display image provided by the display device 20.

For example, in some embodiments of the present disclosure, the value of the difference between the distance L22 (i.e., the width of the light control region 202 in the first direction R1), which is between the two opposite edges 230 and 240 of the light control region 202 in the first direction R1, and the distance L21 (i.e., the width of the display region 201 in the first direction R1), which is between the two opposite edges 210 and 220 of the display region 201 in the first direction R1, may also be greater than twice the absolute value Xmax1 of the maximum bonding tolerance between the display liquid crystal panel 21 and the light control panel 22 in the first direction R1 in the case where the display liquid crystal panel 21 and the light control panel 22 are aligned and bonded. That is, the value of the predetermined distance described above may also be greater than 2*Xmax1, so that the width of the actual display region of the display device 20 in the first direction R1 can be further ensured, and the area loss caused to the actual display region of the display device 20 in the first direction R1 can be avoided.

For example, in the actual situation, due to the difference of equipment or actual operating environment, it is difficult to accurately determine the absolute value Xmax1 of the maximum bonding tolerance between the display liquid crystal panel 21 and the light control panel 22 in the first direction RE Thus, by allowing the value of the predetermined distance to be greater than 2*Xmax1, it can be further ensured that the orthographic projection of the display region 201 on the light control panel 22 can be located within the light control region 202 of the light control panel 22 in the first direction R1, so that the loss of the actual display region of the display device 20 in the first direction R1 caused by the bonding deviation can be more effectively avoided.

For example, as illustrated in FIG. 2, the display liquid crystal panel 21 further includes a first light-shielding region 203 around the display region 201, and an orthographic projection of the first light-shielding region 203 on the light control panel 22 at least partially overlaps with the light control region 202 of the light control panel 22 in the first direction RE For example, the light-shielding region 203 can avoid or reduce the interference of unnecessary light on the part near the edge 210 and the part near the edge 220 in the display region 201.

For example, as illustrated in FIG. 2, the light control panel 22 further includes a second light-shielding region 204 around the light control region 202. For example, in the case where the light control panel 22 and the display liquid crystal panel 21 have the same shape and the same size, the difference between the area of the first light-shielding region 203 and the area of the second light-shielding region 204 is equal to the difference between the area of the light control region 202 and the area of the display region 201.

For example, as illustrated in FIG. 2, the display device 20 further includes a backlight 23 source. The backlight source 23 is located on a side of the light control panel 22 away from the display liquid crystal panel 21, and is configured to provide initial backlight to the light control panel 22. The light control panel 22 is configured to adjust the initial backlight to obtain the adjusted backlight and provide the adjusted backlight to the display liquid crystal panel 21. Therefore, the display device 20 can more effectively control the brightness of the provided display image through the light control panel 22, and for example, the intensity of transmitted light of the dark state region in the display image can be reduced, thereby avoiding or alleviating the leakage phenomenon of the dark state region of the display device 20, improving the contrast of the display image, and improving the display quality and display effect of the display image.

It should be noted that the embodiments of the present disclosure do not limit the type of the backlight source 23. For example, the backlight source 23 includes a plurality of light sources, such as a plurality of line light sources or a plurality of point light sources. For example, the point light source may be an LED (light-emitting diode) light source, and the line light source may be a CCFL (cold cathode fluorescent lamp) light source. For example, the backlight source 23 may be a direct backlight source, a side-in backlight source, and the like, and the side-in backlight source further includes a light guide plate. In addition, the backlight source 23 may also include an optical functional film as required, such as a diffusion film, a prism film, or the like, and the embodiments of the present disclosure are not limited in this aspect.

For example, the structure and arrangement of the backlight source 23 may refer to the conventional design in the art, and the embodiments of the present disclosure are not limited in this aspect.

It should be noted that the display device 20 illustrated in FIG. 2 may also include other structures or films. For example, in at least one embodiment, the display device 20 may also include an isotropic diffusion film (IDF) disposed between the display liquid crystal panel 21 and the light control panel 22 or other functional films or structures, and the embodiments of the present disclosure are not limited in this aspect.

It should be noted that the specific structures of the display liquid crystal panel 21 and the light control panel 22 may refer to the conventional design schemes in the art, and the embodiments of the present disclosure are not limited in this aspect. For example, the display liquid crystal panel 21 may include various components for display, such as a gate line, a data line, a pixel electrode, a common electrode, a liquid crystal layer, a color filter layer, etc. Furthermore, the display liquid crystal panel 21 may be of various types, such as a vertical electric field type or a horizontal electric field type, and for the horizontal electric field type, the display liquid crystal panel 21 may be of an in-plane switching (IPS) type, a fringe field switching (FFS) type, or an advanced dimensional switching (ADS) type. The light control panel 22 may include various components for light control, such as a gate line, a data line, a pixel electrode, a common electrode, a liquid crystal layer, etc. Similarly, the light control panel 22 may be of various types, such as a vertical electric field type or a horizontal electric field type, and for the horizontal electric field type, the light control panel 22 may be an in-plane switching (IPS) type, a fringe field switching (FFS) type, or an advanced dimensional switching (ADS) type.

For example, in the display device 20 provided by the embodiments of the present disclosure, the light control panel 22 may be a light control liquid crystal panel, or may also be other types of panels with light control functions, such as an electronic ink panel, an electrochromic panel, or the like.

It should be noted that in the display device 20 illustrated in FIG. 2, only the difference relationship between the distance L21, which is between the two opposite edges 210 and 220 of the display region 201 in the first direction R1, and the distance L22, which is between the two opposite edges 230 and 240 of the light control region 202 in the first direction R1, is shown. The difference relationship between the distance, which is between the two opposite edges of the display region 201 in other directions, and the distance, which is between the two opposite edges of the light control region 202 in other directions, in the display device 20 may be set with reference to the above contents, and details are not described herein.

For example, according to different actual conditions, such as the actual specifications of the display liquid crystal panel and the light control panel, the precision standard that can be achieved by the bonding process, and the like, in the display device provided by some embodiments of the present disclosure, the width of the light control region in one direction (for example, in the first direction R1) only needs to be greater than the width of the display region in that direction. For example, the value of the width of the light control region greater than the width of the display region in one direction may be greater than or equal to twice the absolute value of the maximum bonding deviation in that direction, so that the orthographic projection of the display region on the light control panel can be located in the light control region of the light control panel. In the display device provided by some embodiments of the present disclosure, it is necessary to enable the width of the light control region to be greater than the width of the display region in multiple directions (e.g., including the first direction R1). For example, the value of the width of the light control region greater than the width of the display region in those directions may be greater than or equal to twice the absolute value of the maximum bonding deviation in those directions, so that the orthographic projection of the display region on the light control panel can be located in the light control region of the light control panel.

For example, according to different actual conditions, such as the actual specifications of the display liquid crystal panel and the light control panel, the precision standard that can be achieved by the bonding process, or the like, in the display device provided by some embodiments of the present disclosure, the difference between the width of the light control region and the width of the display region in a certain direction or some directions may be set to be equal to or slightly greater than twice the absolute value of the maximum bonding deviation in that direction, while the difference between the width of the light control region and the width of the display region in other directions may be set to be greater than twice the absolute value of the maximum bonding deviation in that direction. That is, in the display device, the difference between the width of the light control region and the width of the display region in different directions may be determined separately, and the embodiments of the present disclosure are not limited in this aspect.

It should be noted that in the display device provided by the embodiments of the present disclosure, there are no restrictions on the shapes or sizes of the display liquid crystal panel and the display region, and the shapes or sizes of the corresponding light control panel and the light control region. For example, the display liquid crystal panel and the light control panel may have the same shape and the same size, or the size of the light control panel may be slightly greater than the size of the display liquid crystal panel. For example, the shape of the display region and the shape of the light control region may be the same or different.

In the following, the planar structure of the display device 20 illustrated in FIG. 2 is described by taking the case that the shape of the display liquid crystal panel and the shape of the light control panel are square and the shape of the display region and the shape of the light control region are square as an example.

Figure 3:
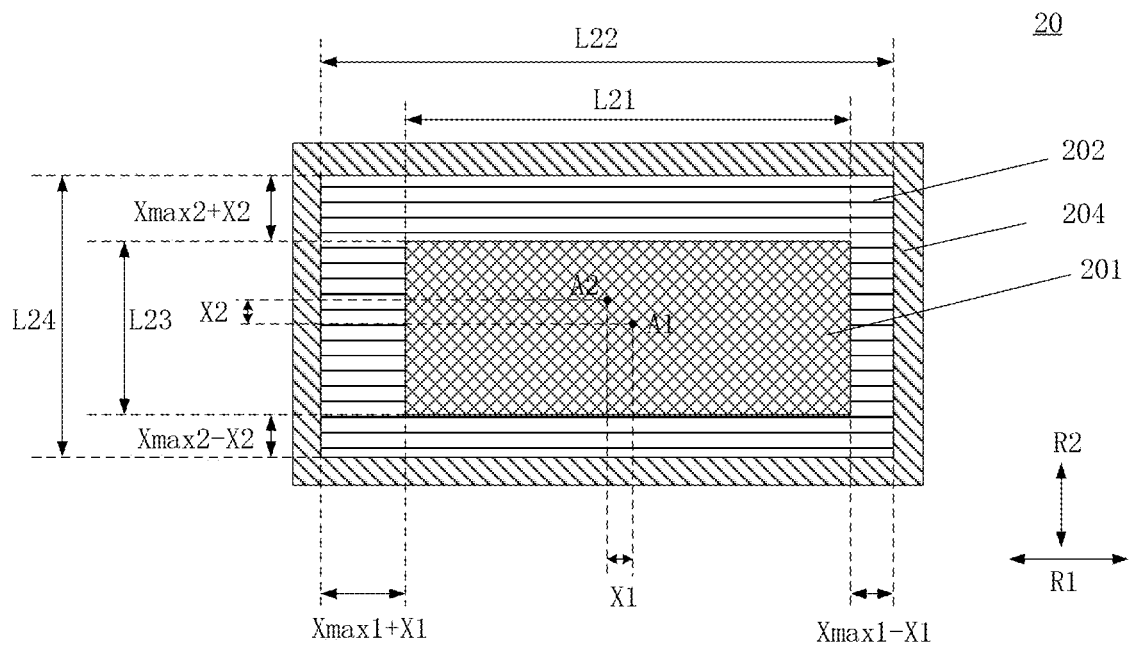
FIG. 3 is a schematic planar view of a display device provided by some embodiments of the present disclosure.

FIG. 3 is a schematic planar view of a display device provided by some embodiments of the present disclosure, for example, a schematic planar view of the display device 20 illustrated in FIG. 2.

For example, as illustrated in FIG. 2 and FIG. 3, a difference between the distance L21, which is between two opposite first display edges (i.e., edges 210 and 220) of the display region 201 in the first direction R1, and the distance L22, which is between two opposite first light control edges (i.e., edges 230 and 240) of the light control region 202 in the first direction R1, is a first predetermined distance. The value of the first predetermined distance is equal to twice the absolute value Xmax1 of the maximum bonding tolerance between the display liquid crystal panel 21 and the light control panel 22 in the first direction R1 in the case where the display liquid crystal panel 21 and the light control panel 22 are bonded, that is, L22−L21=2*Xmax1. A difference between the distance L23, which is between two opposite second display edges of the display region 201 in the second direction R2, and the distance L24, which is between two opposite second light control edges of the light control region 202 in the second direction R2, is a second predetermined distance. The value of the second predetermined distance is equal to twice the absolute value Xmax2 of the maximum bonding tolerance between the display liquid crystal panel 21 and the light control panel 22 in the second direction R2 in the case where the display liquid crystal panel 21 and the light control panel 22 are bonded, that is, L24−L23=2*Xmax2.

For example, as illustrated in FIG. 2 and FIG. 3, in the case where there is a deviation between the display liquid crystal panel 21 and the light control panel 22 in the display device 20 after the display liquid crystal panel 21 and the light control panel 22 are bonded while the deviation in the first direction R1 is X1 and the deviation in the second direction R2 is X2, that is, in the case where the deviation between the orthographic projection of the center A2 of the light control region 202 on the display liquid crystal panel 21 and the center A1 of the display region 201 in the first direction R1 is X1 and the deviation between the orthographic projection of the center A2 of the light control region 202 on the display liquid crystal panel 21 and the center A1 of the display region 201 in the second direction R2 is X2, the width L22 of the light control region 202 in the first direction R1 is greater than the width L21 of the display region 201 in the first direction R1 by 2*Xmax1, and therefore, in the display device 20, the distance between the orthographic projection of the edge 210 of the display region 201 on the light control panel 22 and the adjacent edge 230 of the light control region 202 is Xmax1+X1, and the distance between the orthographic projection of the edge 220 of the display region 201 on the light control panel 22 and the adjacent edge 240 of the light control region 202 is Xmax1−X1. Accordingly, the width L24 of the light control region 202 in the second direction R2 is greater than the width L23 of the display region 201 in the second direction R2 by 2*Xmax2, and therefore, in the display device 20, the distances between each of two opposite edges of the display region 201 in the second direction R2 and a corresponding adjacent edge of two opposite edges of the light control region 202 in the second direction R2 are Xmax2+X2 and Xmax2−X2, respectively.

Because Xmax1≥X1 and Xmax2≥X2, the orthographic projection of the display region 201 on the light control panel 22 in the first direction R1 can be located within the light control region 202 of the light control panel 22, and the orthographic projection of the display region 201 on the light control panel 22 in the second direction R2 can be located within the light control region 202 of the light control panel 22, that is, the orthographic projection of the display region 201 on the light control panel 22 is located within the light control region 202 of the light control panel 22. Therefore, in each of the first direction R1 and the second direction R2, the width of the actual display region in the display device 20 may be equal to the width of the display region 201, thereby avoiding the area loss of the actual display region of the display device 20 due to the bonding deviation, ensuring the integrity and accuracy of the display image provided by the display device 20, apparently improving the display effect and display quality of the display image, and further enhancing the reliability and stability of the product.

For example, in the embodiment illustrated in FIG. 3, the case that the shape of the display region 201 and the shape of the light control region 202 are square is taken as an example for description, that is, the first direction R1 is perpendicular to the second direction R2. In other embodiments of the present disclosure, according to the actual different shapes of the display region 201 and the light control region 202, for example, the shape of the display region 201 and the shape of the light control region 202 may also be trapezoidal, rhombic, or the like, and the angle relationship between the first direction R1 and the second direction R2 may be adjusted accordingly.

For example, in some embodiments of the present disclosure, the difference between the distance (i.e., the width L22 of the light control region 202 in the first direction R1), which is between the two opposite edges of the light control region 202 in the first direction R1, and the distance (i.e., the width L21 of the display region 201 in the first direction R1), which is between the two opposite edges of the display region 201 in the first direction R1, may also be greater than twice the absolute value Xmax1 of the maximum bonding tolerance between the display liquid crystal panel 21 and the light control panel 22 in the first direction R1 in the case where the display liquid crystal panel 21 and the light control panel 22 are bonded, that is, L22−L21>2*Xmax1. The difference between the distance (i.e., the width L24 of the light control region 202 in the second direction R2), which is between the two opposite edges of the light control region 202 in the second direction R2, and the distance (i.e., the width L23 of the display region 201 in the second direction R2), which is between the two opposite edges of the display region 201 in the second direction R2, may also be greater than twice the absolute value Xmax2 of the maximum bonding tolerance between the display liquid crystal panel 21 and the light control panel 22 in the second direction R2 in the case where the display liquid crystal panel 21 and the light control panel 22 are bonded, that is, L24−L23>2*Xmax2. Therefore, the widths of the actual display region of the display device 20 in the first direction R1 and the second direction R2 can be further ensured, so as to avoid the area loss of the actual display region of the display device 20.

For example, in actual situations, due to differences in the equipment, actual operating environment, and the like, it is difficult to accurately determine the absolute value Xmax1 of the maximum bonding tolerance of the display liquid crystal panel 21 and the light control panel 22 in the first direction R1 and the absolute value Xmax2 of the maximum bonding tolerance of the display liquid crystal panel 21 and the light control panel 22 in the second direction R2. Therefore, by allowing the value of the first predetermined distance and the value of the second predetermined distance to be greater than 2*Xmax1 and 2*Xmax2, respectively, it can be further ensured that the orthographic projection of the display region 201 on the light control panel 22 is located in the light control region 202 of the light control panel 22, thereby effectively avoiding the loss of the area of the actual display region of the display device 20 due to the bonding deviation.

For example, in some embodiments of the present disclosure, the light control panel includes a light control pixel array, and the light control pixel array is configured to adjust backlight emitted into the light control panel, so as to allow the light control panel to provide the adjusted backlight to the display liquid crystal panel. The light control pixel array is located at least in the light control region.

For example, in some embodiments of the present disclosure, the display region of the display liquid crystal panel includes a plurality of display pixel units arranged in an array, such as a display pixel array. For example, the display device separately adjusts the brightness of the backlight, received by the plurality of display pixel units in the display pixel array, according to different regions through the light control pixel array located in the light control region.

In the following, the structural design of the light control pixel array in the display device 20 is described by taking the structure of the display device 20 illustrated in FIG. 2 and FIG. 3 as an example.

Figure 4:
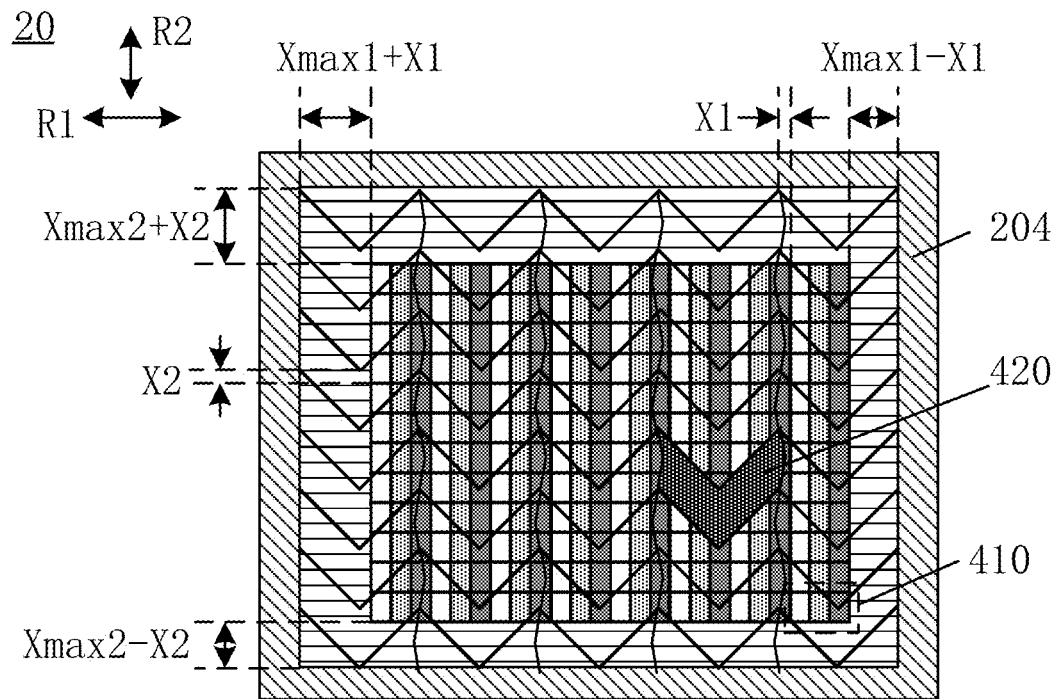
FIG. 4 is a schematic diagram of a light control pixel array and a display pixel array in a display device provided by some embodiments of the present disclosure.

FIG. 4 is a schematic diagram of a light control pixel array and a display pixel array in a display device provided by some embodiments of the present disclosure, for example, a schematic diagram of the light control pixel array and the display pixel array in the display device 20 illustrated in FIG. 2 and FIG. 3.

For example, as illustrated in FIG. 3 and FIG. 4, the display region 201 of the display device 20 includes a plurality of display pixel units 410 arranged in an array. The light control pixel array of the display device 20 includes a plurality of light control pixel units 420 arranged in an array.

For example, in the light control panel 22 of the display device 20, the second light-shielding region 204 at least partially shields the light control pixel units 420, located at the edges of the light control region 202 in the first direction R1 and the second direction R2, in the light control pixel array, so as to form the light control region 202. For example, as illustrated in FIG. 4, one part of the light control pixel unit 420, which is located at the edge of the light control region 202 in the first direction R1 and the second direction R2, in the light control pixel array is located in the light control region 202, and the other part of that light control pixel unit 420 is shielded by the second light-shielding region 204.

For example, in the display device 20 illustrated in FIG. 3 and FIG. 4, the first light-shielding region (not shown) of the display liquid crystal panel 21 shields the part of the display liquid crystal panel 21 except for the display region 201. For example, the first light-shielding region can shield the part, which does not overlap with the display region 201, of the light control region 202 in the direction perpendicular to the main surface of the display liquid crystal panel 21, so as to prevent the light control pixel unit 420 located in that partial region from interfering with the brightness of the backlight received by the display pixel unit 410 in the display region 201.

For example, in the actual display region of the display device 20, each light control pixel unit 420 corresponds to a plurality of display pixel units 410 in a part of the display region 201, so that the brightness of the backlight received by the display pixel units 410 in the display region 201 can be adjusted separately according to different partial regions.

For example, in the embodiment illustrated in FIG. 4, the plurality of light control pixel units 420 in the light control pixel array have the same structural design, so that the preparation cost and the preparation process difficulty of the display device 20 can be reduced. For example, the number of the light control pixel units 420 can be determined according to the width L22 of the light control region 202 in the first direction R1 and the width L24 of the light control region 202 in the second direction R2, so that the size of the light control pixel array in the first direction R1 is equal to or slightly greater than L22 and the size of the light control pixel array in the second direction R2 is equal to or slightly greater than L24. For example, the part of the light control pixel array located outside the light control region 202 can be shielded by, for example, a black matrix (or a light-shielding layer) provided in the second light-shielding region 204, thereby forming the light control region 202.

Figure 5:
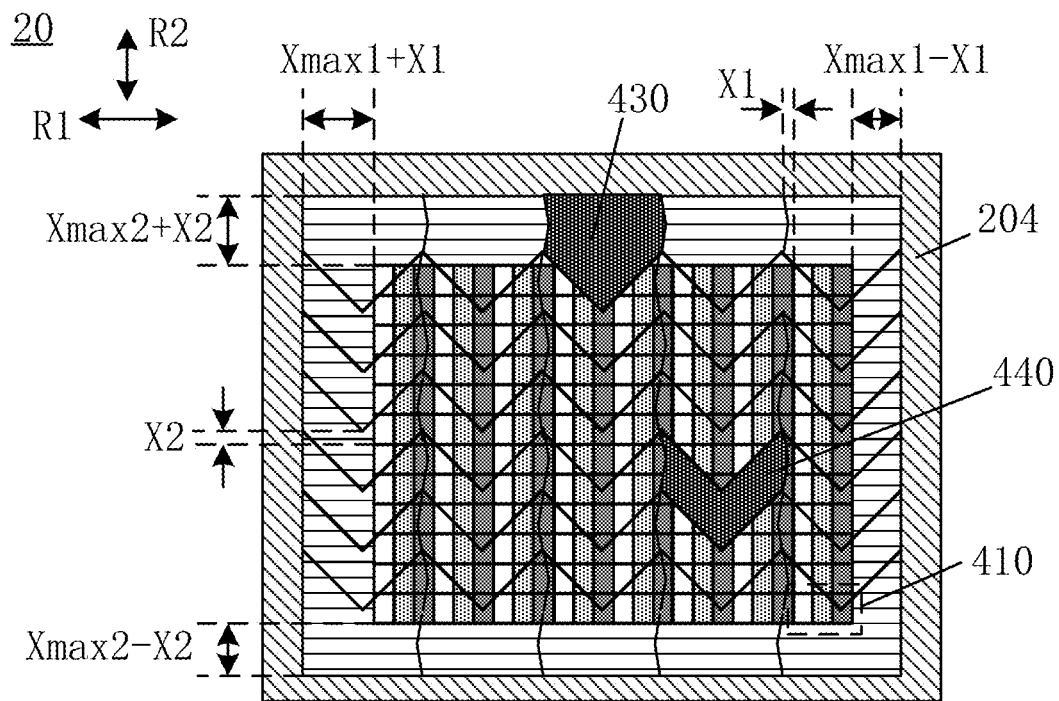
FIG. 5 is a schematic diagram of a light control pixel array and a display pixel array in another display device provided by some embodiments of the present disclosure.

FIG. 5 is a schematic diagram of a light control pixel array and a display pixel array in another display device provided by some embodiments of the present disclosure, for example, a schematic diagram of the control pixel array and the display pixel array in the display device 20 illustrated in FIG. 2 and FIG. 3.

For example, as illustrated in FIG. 3 and FIG. 5, the display region 201 of the display device 20 includes a plurality of display pixel units 410 arranged in an array. The light control pixel array is located in the light control region 202, the light control pixel array includes edge light control pixel units 430 and middle light control pixel units 440, and the edge light control pixel units 430 are provided along the edge of the light control region 202 and surround the middle light control pixel units 440. In at least one direction, such as in the first direction R1 or the second direction R2, a size of the edge light control pixel unit 430 is different from a size of the middle light control pixel unit 440.

For example, compared with the light control pixel array illustrated in FIG. 4, the edge light control pixel unit 430 and the middle light control pixel unit 440 in the light control pixel array illustrated in FIG. 5 have different structural designs, so that the size of the light control pixel array in the first direction R1 and the size of the light control pixel array in the second direction R2 are equal to the width L22 of the light control region 202 in the first direction R1 and the width L24 of the light control region 202 in the second direction R2, respectively. Therefore, there is no need to provide the light control pixel array in the second light-shielding region 204 of the display device 20, so that the structural design and the size of area of the second light-shielding region 204 can be adjusted and optimized more flexibly.

For example, in the display device 20 illustrated in FIG. 5, the size of the edge light control pixel unit 430, which is located along the edge of the light control region 202 in the first direction R1, in the second direction R2 is different from the size of the middle light control pixel unit 440 in the second direction R2. For example, the size of the edge light control pixel unit 430, which is located along the edge of the light control region 202 in the first direction R1, in the second direction R2, may be slightly greater than the size of the middle light control pixel unit 440 in the second direction R2. The size of the edge light control pixel unit 430, which is located along the edge of the light control region 202 in the second direction R2, in the first direction R1 is different from the size of the middle light control pixel unit 440 in the first direction R1. For example, the size of the edge light control pixel unit 430, which is located along the edge of the light control region 202 in the second direction R2, in the first direction R1, may be slightly smaller than the size of the middle light control pixel unit 440 in the first direction R1.

It should be noted that, in the display device 20 illustrated in FIG. 5, the size relationship between each of the edge light control pixel units 430 located at different positions and the middle light control pixel unit 440 in the first direction R1 and the second direction R2 is only an example. For example, in some other embodiments of the present disclosure, the size relationship between each of the edge light control pixel units 430 and the middle light control pixel unit 440 in the first direction R1 and the second direction R2 may be set according to the widths of the display region 201 in the first direction R1 and the second direction R2 and the widths of the light control region 202 in the first direction R1 and the second direction R2, and the embodiments of the present disclosure are not limited in this aspect.

It should be noted that in the display device 20 illustrated in FIG. 5, the design structure of the edge light control pixel unit 430 is only an example. In other embodiments of the present disclosure, the design structure of the edge light control pixel unit 430 may be set according to, for example, the outline shape and size of the light control region 202, and the embodiments of the present disclosure are not limited in this aspect.

For example, the specific structure and arrangement of the light control pixel units 420 illustrated in FIG. 4 and the edge light control pixel units 430 and the middle light control pixel units 440 illustrated in FIG. 5 may refer to the conventional design in the art, and the embodiments of the present disclosure are not limited in this aspect.

It should be noted that the light control pixel array and the display pixel array illustrated in FIG. 4 and FIG. 5 are only examples. For example, the number, specific structure, arrangement, and the like of the light control pixel units in the light control pixel array, and the number, specific structure, arrangement, and the like of the display pixel units in the display pixel array are not limited in the embodiments of the present disclosure.

For example, in the display device provided by some embodiments of the present disclosure, for example, referring to the display device 20 illustrated in FIG. 4 and FIG. 5, the absolute value Xmax1 of the maximum bonding tolerance of the display liquid crystal panel 21 and the light control panel 22 in the first direction R1 is generally smaller than the size of the display pixel unit 410 in the first direction R1, and the absolute value Xmax2 of the maximum bonding tolerance of the display liquid crystal panel 21 and the light control panel 22 in the second direction R2 is generally smaller than the size of the display pixel unit 410 in the second direction R2. Therefore, in the case where there is the bonding deviation between the display liquid crystal panel 21 and the light control panel 22, there is no correspondence abnormality between the light control pixel unit (for example, the light control pixel unit 420, the edge light control pixel unit 430, and the middle light control pixel unit 440) and the display pixel unit 410 in the display device 20, so that the normal display of the image of the display device 20 can be ensured.

It should be noted that in the display device provided by the embodiments of the present disclosure, each display pixel unit of the display liquid crystal panel includes at least one sub-pixel unit, that is, at least one sub-pixel. For example, as illustrated in FIG. 4 and FIG. 5, each display pixel unit 410 includes three sub-pixel units, and the three sub-pixel units are arranged side by side in the first direction R1. The embodiments of the present disclosure are not limited to the specific number, arrangement, and the like of sub-pixel units provided in each display pixel unit, the structure, function, and the like of the display pixel unit may refer to the conventional design schemes in the art, and details are not described herein.

For example, in the display device provided by some embodiments of the present disclosure, according to the requirements of different actual situations, in the case where the absolute value of the bonding tolerance of the display device in at least one direction is greater than or equal to the size of the display pixel unit in that direction, there is generally no gray-scale abrupt change in the display image, for example, the backlight brightness corresponding to adjacent display pixel units may be basically the same or similar under normal circumstances, and therefore, in the case where there is a slight correspondence abnormality between the light control pixel unit and the display pixel unit in the display device, the display device can still provide a relative normal display image.

For example, in the display device provided by some embodiments of the present disclosure, according to the value of the maximum bonding tolerance usually existing in the current bonding process, the minimum value range of the difference between the distance, which is between the two opposite edges of the light control region in at least one direction, and the distance, which is between the two opposite edges of the display region in the at least one direction, may range from, for example, 400 microns to 600 microns, and further may range from 200 microns to 400 microns.

For example, in the display device provided by some embodiments of the present disclosure, because the specific value range of the bonding tolerance needs to be determined according to conditions, such as the size specifications of the display liquid crystal panel and the light control panel, the bonding equipment used, the bonding process adopted, different actual operating environments, and the like, the size relationship between the display liquid crystal panel and the light control panel may also be set according to the size of the display pixel unit in the display liquid crystal panel in the case where it is relatively difficult to accurately determine the value of the maximum bonding tolerance.

For example, in the display device provided by some embodiments of the present disclosure, the display region includes a plurality of display pixel units arranged in an array. The difference between the distance, which is between the two opposite edges of the light control region in at least one direction, and the distance, which is between the two opposite edges of the display region in the at least one direction, is a predetermined distance, and the value of the predetermined distance is greater than or equal to the size of the display pixel unit in the at least one direction.

For example, for a square display device with a size of 61 inches, the width of the display pixel unit is usually 372 microns. Accordingly, the difference between the distance, which is between the two opposite edges of the light control region in the width direction, and the distance, which is between the two opposite edges of the display region in the width direction, may be set to be greater than or equal to 372 microns or 370 microns. For example, for a square display device with a size of 55 inches, the width of the display pixel unit is usually 315 microns. Accordingly, the difference between the distance, which is between the two opposite edges of the light control region in the width direction, and the distance, which is between the two opposite edges of the display region in the width direction, may be set to be greater than or equal to 315 microns or 320 microns.

For example, the light control panel in the display device provided by the embodiments of the present disclosure may be a light control liquid crystal panel or other panels with light control functions. The display device provided by the embodiments of the present disclosure may be a liquid crystal display device or other devices with display functions.

For example, in the display device provided by some embodiments of the present disclosure, the light control panel further includes a first gate driving circuit, and the first gate driving circuit is located in the second light-shielding region and on at least one side of the light control region. The first gate driving circuit includes a plurality of cascaded first shift register units, and the plurality of first shift register units are electrically connected to a plurality of rows of light control pixel units in the light control pixel array, respectively, so as to provide a first gate driving signal. The first shift register unit includes a first transistor, and the first transistor includes a plurality of active layers arranged side by side, and for example, includes two rows of active layers arranged side by side.

In shift register units of the light control panel and display liquid crystal panel, transistors (such as an output transistor, an input transistor, a reset transistor, etc.) which provide the same or similar functions are basically the same in size, for example, the length and width of the transistor are basically the same, and therefore, by arranging the active layers of the first transistor in the first shift register unit of the light control panel in multiple rows (for example, in two rows) and connecting the source electrode and drain electrode of the first transistor in series, the size of the first shift register unit in different directions can be adaptively adjusted according to different actual requirements, thereby optimizing the layout design in the second light-shielding region of the light control panel and further simplifying the preparation process of the display device.

Figure 6:
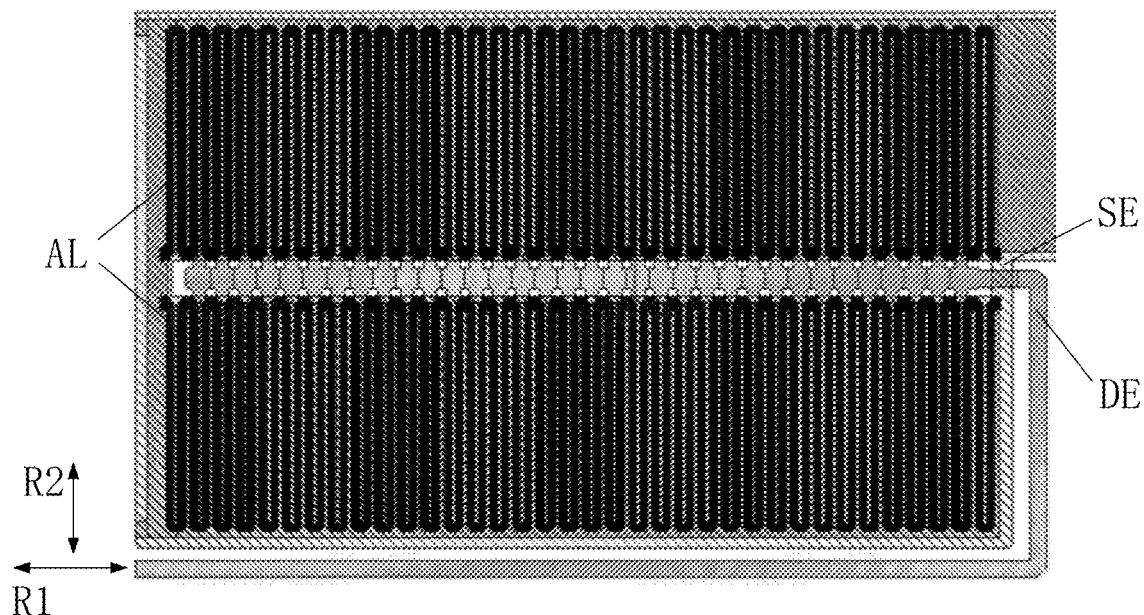
FIG. 6 is a schematic diagram of a specific arrangement example of active layers of a first transistor in a first shift register unit provided by some embodiments of the present disclosure.

For example, referring to the display device 20 illustrated in FIG. 3 as an example, the active layers of the first transistor in the first shift register unit in the second light-shielding region 204 of the light control panel 22 include two rows of active layers AL arranged in parallel along the second direction R2 as illustrated in FIG. 6, each row of active layers AL includes a plurality of U-shaped structures which are arranged side by side along the first direction R1 and connected to each other, and the two rows of active layers AL are connected in series, for example, through the source electrode SE and drain electrode DE of the first transistor, so that the size occupied by the first shift register unit in the first direction R1 can be reduced. Therefore, in the case where the width of the second light-shielding region 204 in the first direction R1 is smaller than the width of the first light-shielding region 203 in the first direction R1, the layout structure in the second light-shielding region 204 of the light control panel 22 can be optimized by reducing the size of the first shift register unit in the first direction R1 and increasing the size of the first shift register unit in the second direction R2 in the light control panel 22, thereby simplifying the preparation process of the display device 20.

For example, in some embodiments of the present disclosure, the first shift register unit may further include a plurality of transistors in which the active layers are arranged in a plurality of rows (for example, in two rows, three rows, or more), so that the size occupied by the first shift register unit in different directions can be further adaptively adjusted, and the layout design in the second light-shielding region of the light control panel can be optimized.

Figure 7:
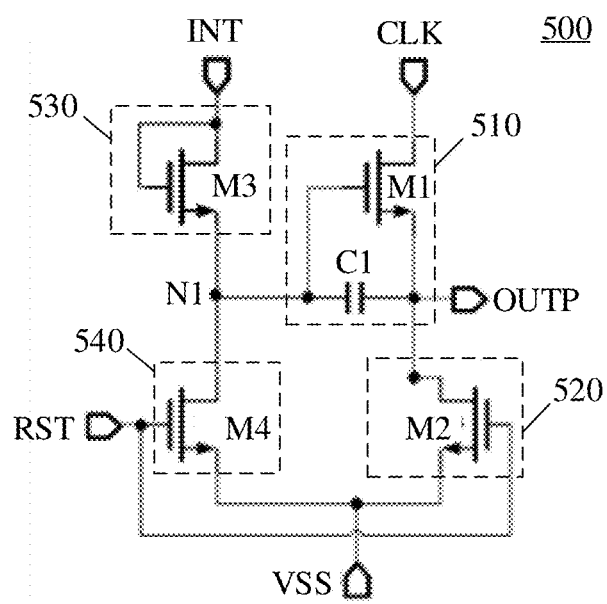
FIG. 7 is a circuit diagram of a specific implementation example of a first shift register unit provided by some embodiments of the present disclosure.

FIG. 7 is a circuit diagram of a specific implementation example of a first shift register unit provided by some embodiments of the present disclosure.

For example, as illustrated in FIG. 7, the first shift register unit 500 includes an output circuit 510, an output reset circuit 520, an input circuit 530, and a noise reduction circuit 540.

For example, the input circuit 530 includes a third transistor M3. A gate electrode of the third transistor M3 is connected to a first electrode of the third transistor M3, and is configured to be connected to an input terminal INT to receive an input signal, and a second electrode of the third transistor M3 is configured to be connected to a first node N1. The third transistor M3 is configured to write the input signal to the first node N1 in response to the input signal, so as to control a level of the first node N1.

For example, the output circuit 510 includes a first transistor M1, and the first transistor M1 includes two rows of active layers arranged side by side, and for example, includes two rows of active layers AL connected in series, for example, through the source electrode SE and the drain electrode DE as illustrated in FIG. 6. A gate electrode of the first transistor M1 is connected to the first node N1, a first electrode of the first transistor M1 is connected to a clock signal terminal CLK to receive a clock signal, and a second electrode of the first transistor M1 is connected to an output terminal OUTP. For example, the first transistor M1 is configured to receive the clock signal and output the clock signal to the output terminal OUTP as the first gate driving signal under control of the level of the first node N1.

For example, the output circuit 510 further includes a first capacitor C1. A first electrode of the first capacitor C1 is configured to be connected to the first node N1, and a second electrode of the first capacitor C1 is configured to be connected to the output terminal OUTP.

For example, the output reset circuit 520 includes a second transistor M2, and the second transistor M2 includes two rows of active layers arranged side by side, and for example, includes two rows of active layers AL connected in series, for example, through the source electrode SE and the drain electrode DE as illustrated in FIG. 6. A gate electrode of the second transistor M2 is connected to a reset terminal RST to receive a reset signal, a first electrode of the second transistor M2 is connected to the output terminal OUTP, and a second electrode of the second transistor M2 is connected to a first voltage terminal VSS (for example, providing a low-level voltage). The second transistor M2 is configured to apply, for example, a low-level voltage to the output terminal OUTP in response to the reset signal, so as to reset the output terminal OUTP.

For example, the noise reduction circuit 540 includes a fourth transistor M4. A gate electrode of the fourth transistor M4 is connected to the reset terminal RST to receive the reset signal, a first electrode of the fourth transistor M4 is connected to the first node N1, and a second electrode of the fourth transistor M4 is connected to the first voltage terminal VSS. The fourth transistor M4 is configured to apply, for example, a low-level voltage, to the first node N1 in response to the reset signal, so as to perform noise reduction.

For example, in the above examples, the first transistor M1 is a transistor which provides an output function in the output circuit 510, that is, an output transistor; and the second transistor M2 is a transistor, which provides a function of resetting the output terminal, in the output reset circuit 520, that is, an output reset transistor. Generally, in order to ensure the charging rate, the size of the active layer of the output transistor or the output reset transistor in the first shift register unit 500 may be larger, and the size of the first shift register unit 500 in a certain direction may be larger in the case where a single active layer or a single row of active layers is used. For example, referring to the display device 20 illustrated in FIG. 3 as an example, in the case where the active layers of the output transistor or the output reset transistor are arranged in a single row along the first direction R1, the first shift register unit 500 may need to occupy more space in the second light-shielding region 204 in the first direction R1. For example, the channel length of the output transistor (i.e., the first transistor M1) may be thousands of microns, and the size of the output transistor in the large-size and high-resolution TV product may even be greater than 10,000 microns. In addition, because the output reset transistor (i.e., the second transistor M2) is used for discharging, the size of the active layer of the output reset transistor may be larger. Therefore, by using the first transistor M1 and the second transistor M2, which respectively include two rows of active layers arranged in parallel, as the output transistor and the output reset transistor, respectively, the layout structure in the second light-shielding region of the light control panel can be optimized, thereby simplifying the preparation process of the display device.

It should be noted that the circuit structure of 4T1C (e.g., four transistors and one capacitor) illustrated in FIG. 7 is only an example. In other embodiments of the present disclosure, the first shift register unit of the light control panel may also adopt other types of circuit structures, such as 6T1C (e.g., six transistors and one capacitor), 17T1C (e.g., seventeen transistors and one capacitor), 19T1C (e.g., nineteen transistors and one capacitor), etc. The embodiments of the present disclosure are not limited in this aspect.

It should be noted that in the first shift register unit 500 illustrated in FIG. 7, the first transistor and the second transistor, which respectively include two rows of active layers arranged in parallel, are the output transistor and the output reset transistor, respectively, and in other embodiments of the present disclosure, the active layers of other transistors in the circuit structure may also be arranged in two rows (or more rows) and connected in series through the source electrode and drain electrode of the transistor according to different actual requirements. The embodiments of the present disclosure are not limited in this aspect.

It should be noted that the first capacitor C1 may be a capacitor device manufactured by a process, for example, a capacitor device is realized by manufacturing special capacitor electrodes, and each electrode of the capacitor may be realized through a metal layer, a semiconductor layer (e.g., doped polysilicon), etc. In addition, the first capacitor C1 may also be a parasitic capacitor between transistors, which may be realized by the transistors and other components and circuits.

It should be noted that the first node N1 does not represent actual components, but represents the convergence point of related electrical connections in the circuit diagram.

It should be noted that all the transistors used in the first shift register unit 500 may be thin film transistors, field effect transistors, or other switching devices with the same characteristics, and the embodiments of the present disclosure are described herein by taking the thin film transistors as an example. The source electrode and drain electrode of the transistor used here may be symmetrical in structure, so that there may be no difference in structure between the source electrode and the drain electrode. In the embodiments of the present disclosure, in order to distinguish the two electrodes (i.e., the source electrode and the drain electrode) of the transistor except for the gate electrode, it is directly described that one electrode is the first electrode and the other electrode is the second electrode. Transistors in the embodiments of the present disclosure are all described by taking N-type transistors as an example, and in this case, the first electrode of the transistor is the drain electrode, and the second electrode of the transistor is the source electrode. It should be noted that the present disclosure includes but is not limited to this case. For example, one or more transistors in the shift register unit 500 provided by the embodiments of the present disclosure may also adopt the P-type transistor, and in this case, the first electrode of the transistor is the source electrode, and the second electrode of the transistor is the drain electrode, as long as the respective electrodes of the selected type of the transistor are connected with reference to the respective electrodes of the corresponding transistor in the embodiments of the present disclosure, and the corresponding voltage terminals provide the corresponding high voltage or low voltage. In the case where N-type transistors are used, indium gallium zinc oxide (IGZO) may be used as the active layer of the thin film transistor, and compared with the low temperature poly silicon (LTPS) or amorphous silicon (such as hydrogenated amorphous silicon) as the active layer of the thin film transistor, the size of the transistor can be effectively reduced and the leakage current can be prevented.

For example, in the display device provided by some embodiments of the present disclosure, the display liquid crystal panel further includes a second gate driving circuit, and the second gate driving circuit is located in the first light-shielding region and on at least one side of the display region. The second gate driving circuit includes a plurality of cascaded second shift register units, and the plurality of second shift register units are electrically connected to a plurality of rows of display pixel units in the display region, respectively, so as to provide a second gate driving signal. The number of transistors included in the first shift register unit is greater than the number of transistors included in the second shift register unit.

In the shift register units of the light control panel and the display liquid crystal panel, the transistors (such as an output transistor, an input transistor, a reset transistor, etc.) which provide the same or similar functions are basically the same in size, for example, the length and width of the transistor are basically the same, and therefore, in the case where the number of the transistors included in the first shift register unit is large, by allowing the active layers of one or more transistors in the first shift register unit to be arranged in two rows (or multiple rows), the size of the first shift register unit and the size of the second shift register unit in a certain direction are basically the same, so that the layout design of the display device can be optimized according to different actual requirements, and the preparation process of the display device can be simplified.

For example, in the display device provided by some embodiments of the present disclosure, the first shift register unit of the light control panel may adopt a 19T1C (e.g., nineteen transistors and one capacitor) circuit structure, and the second shift register unit of the display liquid crystal panel may adopt a 17T1C (e.g., seventeen transistors and one capacitor) circuit structure.

For example, in the display device provided by some embodiments of the present disclosure, a row height of the first shift register unit of the light control panel is smaller than a row height of one row of light control pixel units, that is, along the arrangement direction of multiple rows (for example, two rows) of active layers of the first transistor, the size occupied by the first shift register unit is smaller than the row height of one row of light control pixel units. The first shift register unit is electrically connected to a corresponding row of light control pixel units through a signal line, and the signal line is of a zigzag line type.

Figure 8A:
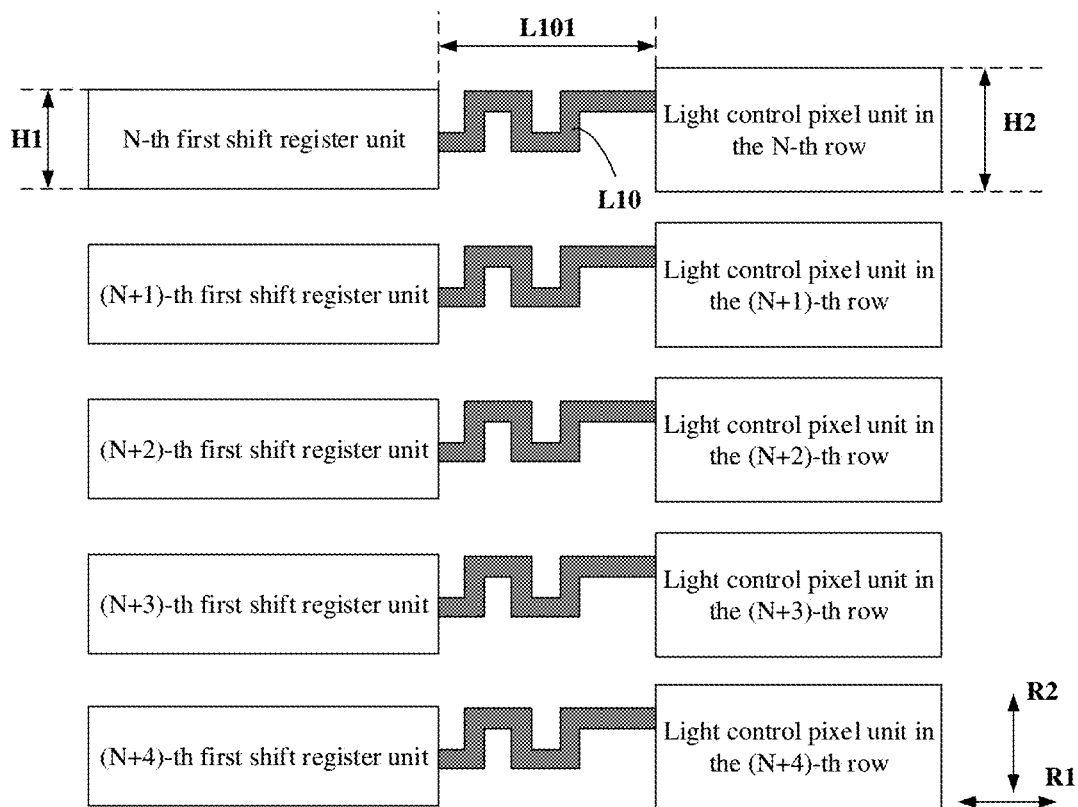
FIG. 8A is a schematic diagram of a connection method between a first shift register unit of a first gate driving circuit and a light control pixel unit provided by some embodiments of the present disclosure.
Figure 8B:
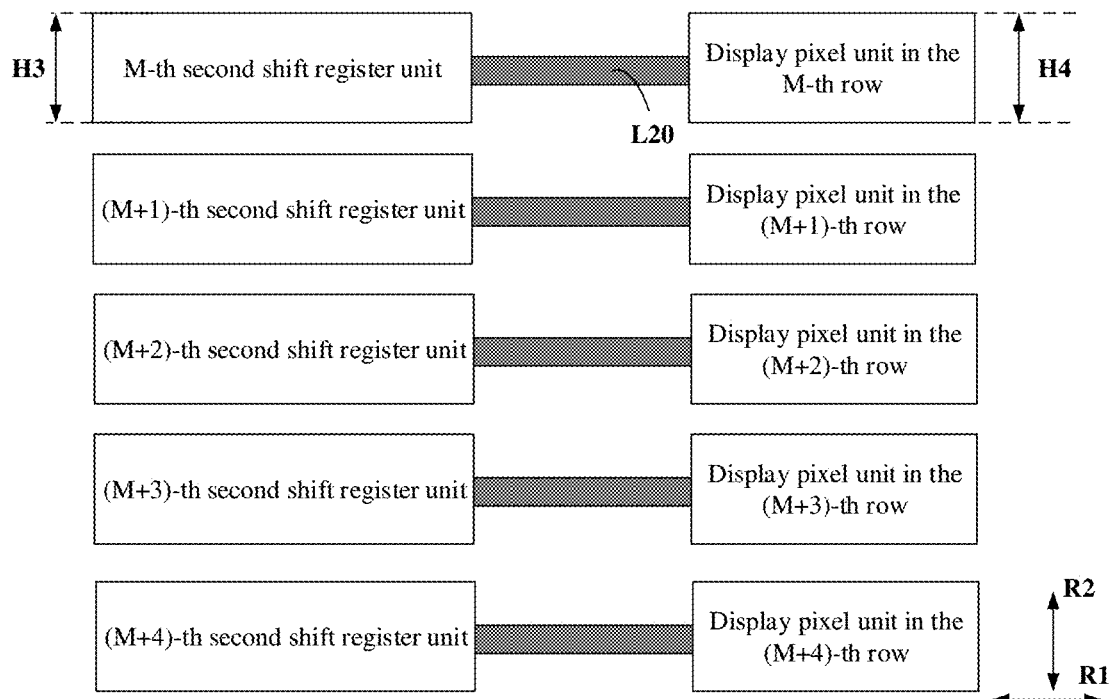
FIG. 8B is a schematic diagram of a connection method between a second shift register unit of a second gate driving circuit and a display pixel unit provided by some embodiments of the present disclosure.

FIG. 8A is a schematic diagram of a connection method between a first shift register unit of a first gate driving circuit and a light control pixel unit provided by some embodiments of the present disclosure, and FIG. 8B is a schematic diagram of a connection method between a second shift register unit of a second gate driving circuit and a display pixel unit provided by some embodiments of the present disclosure.

For example, with reference to the display device 20 illustrated in FIG. 4 as an example, as illustrated in FIG. 4 and FIG. 8A, the first gate driving circuit of the light control panel 22 includes a plurality of cascaded first shift register units (for example, the N-th first shift register unit, the (N+1)-th first shift register unit, the (N+2)-th first shift register unit, the (N+3)-th first shift register unit, the (N+4)-th first shift register unit, etc., N being an integer greater than 0). The plurality of rows of first shift register units are electrically connected to a plurality of rows of light control pixel units in the light control pixel array (for example, the light control pixel units in the N-th row, the light control pixel units in the (N+1)-th row, the light control pixel units in the (N+2)-th row, the light control pixel units in the (N+3)-th row, the light control pixel units in the (N+4)-th row, etc.), respectively, so as to provide the first gate driving signal. For example, the N-th first shift register unit is electrically connected to the light control pixel units in the N-th row, so as to provide the first gate driving signal required by the light control pixel units in the N-th row.

It should be noted that the cascade relationship between the plurality of first shift register units is not illustrated in FIG. 8A, the specific cascade method between the first shift register units of adjacent rows can refer to the conventional design in the art, and the embodiments of the present disclosure are not limited to this case.

For example, the row height H1 of the N-th first shift register unit of the light control panel 22 (i.e., the size of the N-th first shift register unit in the second direction R2) is smaller than the row height H2 of the N-th row of the light control pixel units, i.e., H1<H2, so that the signal line L10 connecting the N-th first shift register unit with the N-th row of the light control pixel units needs to be of a zigzag line type, for example, extending in a serpentine shape.

For example, at least one bend of the signal line L10 may be set at a right angle, so as to reduce the influence of process fluctuation in the preparation process, optimize the preparation process of the light control panel 22, and improve the stability of the prepared light control panel 22. Alternatively, in other embodiments of the present disclosure, according to different actual layout requirements, the bend of the signal line L10 may also be set at other angles, or the signal line L10 may also be set in other suitable shapes, and the embodiments of the present disclosure are not limited to this case.

For example, the plurality of signal lines connecting the plurality of first shift register units and the plurality of rows of light control pixel units occupy approximately the same size in the first direction R1, that is, the lengths of the respective signal lines in the first direction R1 are approximately the same. For example, with reference to the signal line L10 of the N-th row as an example, the length of the signal line L10 of the N-th row in the first direction R1 is L101.

For example, as illustrated in FIG. 4 and FIG. 8B, the second gate driving circuit of the display liquid crystal panel 21 includes a plurality of cascaded second shift register units (e.g., the M-th second shift register unit, the (M+1)-th second shift register unit, the (M+2)-th second shift register unit, the (M+3)-th second shift register unit, the (M+4)-th second shift register unit, etc., M being an integer greater than 0). The plurality of rows of second shift register units are electrically connected to a plurality of rows of display pixel units in the display pixel array (for example, the display pixel units in the M-th row, the display pixel units in the (M+1)-th row, the display pixel units in the (M+2)-th row, the display pixel units in the (M+3)-th row, the display pixel units in the (M+4)-th row, etc.), respectively, so as to provide the second gate driving signal. For example, the M-th second shift register unit is electrically connected to the display pixel units in the M-th row, so as to provide the second gate driving signal required by the display pixel units in the M-th row.

It should be noted that the cascade relationship between the plurality of second shift register units is not illustrated in FIG. 8B, and the specific cascade method between the second shift register units in adjacent rows can refer to the conventional design in the art, and the embodiments of the present disclosure are not limited to this case.

For example, the row height H3 of the M-th second shift register unit of the display liquid crystal panel 21 (that is, the size occupied by the M-th second shift register unit in the second direction R2) is equal to the row height H4 of the M-th row of display pixel units, that is, H3=H4, so that the signal line L20 connecting the M-th second shift register unit with the M-th row of display pixel units can extend in a straight line.

At least one embodiment of the present disclosure further provides a light control panel, and the light control panel includes a light control region. The light control panel is configured to provide adjusted backlight to a display liquid crystal panel on a light-emitting side of the light control panel. The display liquid crystal panel includes a display region, and the display region is configured to receive the adjusted backlight to perform display. A distance between two opposite edges of the light control region in at least one direction is greater than a distance between two opposite edges of the display region in the at least one direction.

In the light control panel provided by at least one embodiment of the present disclosure, the distance between the two opposite edges of the light control region in the at least one direction is greater than the distance between the two opposite edges of the display region in that direction, that is, a width of the light control region of the light control panel in the at least one direction is greater than a width of the display region in that direction, so that after the light control panel and the display liquid crystal panel are aligned and bonded, the area loss of the actual display region of the display liquid crystal panel caused by bonding deviation can be reduced or avoided in the at least one direction. Therefore, the brightness of the display image provided by the display liquid crystal panel can be controlled more effectively through the light control panel to improve the contrast of the display image, and at the same time, the completeness and accuracy of the display image provided by the display liquid crystal panel can be improved, thereby improving the overall display effect and display quality of the display image, improving the reliability and stability of the product, and enabling users to obtain better viewing experience.

For example, in the light control panel provided by at least one embodiment of the present disclosure, a difference between the distance, which is between the two opposite edges of the light control region in the at least one direction, and the distance, which is between the two opposite edges of the display region in the at least one direction, is a predetermined distance, and a value of the predetermined distance is greater than or equal to twice an absolute value of a maximum bonding tolerance of the display liquid crystal panel and the light control panel in the at least one direction.

For example, in the light control panel provided by at least one embodiment of the present disclosure, a distance between two opposite edges of the light control region in any direction is greater than a distance between two opposite edges of the display region in the any direction. Therefore, after the light control panel and the corresponding display liquid crystal panel are aligned and bonded, the orthographic projection of the display region of the display liquid crystal panel on the light control panel can be located within the light control region, thereby avoiding the area loss of the actual display region of the display liquid crystal panel caused by the bonding deviation, ensuring the integrity and accuracy of the provided display image, apparently improving the display effect and display quality of the display image, and further improving the reliability and stability of the product.

For example, the specific structure and function of the light control panel provided by the embodiments of the present disclosure may refer to the descriptions of the light control panel in the display device provided by the embodiments of the present disclosure, for example, the descriptions of the light control panel 22 in the embodiments of the display device 20 described above, and details are not described herein.

At least one embodiment of the present disclosure further provides a manufacturing method of a display device, and the manufacturing method includes: providing a light control panel and a display liquid crystal panel, and aligning and bonding the light control panel and the display liquid crystal panel. The light control panel includes a light control region, and the light control region is configured to provide adjusted backlight to the display liquid crystal panel. The display liquid crystal panel includes a display region, and the display region is configured to receive the adjusted backlight to perform display. A distance between two opposite edges of the light control region in at least one direction is greater than a distance between two opposite edges of the display region in the at least one direction. The display liquid crystal panel is on a light-emitting side of the light control panel.

For example, in the manufacturing method provided by at least one embodiment of the present disclosure, aligning and bonding the light control panel and the display liquid crystal panel, includes: allowing an orthographic projection of the display region of the display liquid crystal panel on the light control panel to be located within the light control region of the light control panel.

For example, in the manufacturing method provided by at least one embodiment of the present disclosure, a difference between the distance between the two opposite edges of the light control region in the at least one direction and the distance between the two opposite edges of the display region in the at least one direction is a predetermined distance, and a value of the predetermined distance is greater than or equal to twice an absolute value of a maximum bonding tolerance of aligning and bonding the display liquid crystal panel and the light control panel in the at least one direction.

The detailed descriptions and effects of the manufacturing method of the display device provided by the embodiments of the present disclosure may refer to the corresponding contents in the display device provided by the embodiments of the present disclosure, for example, the corresponding contents in the embodiments of the display device 20 described above, and details are not described herein.

At least one embodiment of the present disclosure further provides an electronic device, and the electronic device includes any one of the display devices provided by the embodiments of the present disclosure. For example, the electronic device may include the display device 20 in the above embodiments.

For example, the electronic device may be any product or component with display functions, such as a display substrate, a display panel, an electronic paper, a mobile phone, a tablet computer, a television, a display, a notebook computer, a digital photo frame, a navigator, and the like, and the embodiments of the present disclosure are not limited in this aspect.

The following statements should be noted:

(1) The accompanying drawings of the embodiments of the present disclosure involve only the structure(s) in connection with the embodiment(s) of the present disclosure, and other structure(s) can be referred to common design(s).

(2) For the purpose of clarity, in the accompanying drawings for illustrating the embodiment(s) of the present disclosure, the thickness of a layer or a region may be enlarged or narrowed, that is, the drawings are not drawn in a real scale. It should be understood that, in the case where a component such as a layer, a film, a region, a substrate, or the like is referred to be "on" or "under" another component, the component may be "directly" "on" or "under" the another component, or an intermediate component may be disposed therebetween.

(3) In case of no conflict, the embodiments of the present disclosure and features in one embodiment or in different embodiments can be combined to obtain new embodiments.

What have been described above merely are specific implementations of the present disclosure, and the protection scope of the present disclosure is not limited thereto. Any modifications or substitutions that easily occur to those skilled in the art within the technical scope of the present disclosure should be within the protection scope of the present disclosure. Therefore, the protection scope of the present disclosure should be based on the protection scope of the claims.

What is claimed is:

1. A display device, comprising a light control panel and a display liquid crystal panel,
   wherein the display liquid crystal panel is on a light-emitting side of the light control panel;
   the light control panel comprises a light control region, and the light control region is configured to provide adjusted backlight to the display liquid crystal panel;
   the display liquid crystal panel comprises a display region, and the display region is configured to receive the adjusted backlight to perform display;
   a distance between two opposite edges of the light control region in at least one direction is greater than a distance between two opposite edges of the display region in the at least one direction;
   a difference between the distance between the two opposite edges of the light control region in the at least one direction and the distance between the two opposite edges of the display region in the at least one direction is a predetermined distance; and
   the display region comprises a plurality of display pixel units arranged in an array, and a value of the predetermined distance is greater than or equal to a size of each of the display pixel units in the at least one direction.

2. The display device according to claim 1, further comprising a backlight source,
   wherein the backlight source is on a side of the light control panel away from the display liquid crystal panel and is configured to provide initial backlight to the light control panel, and the light control panel is configured to adjust the initial backlight to obtain the adjusted backlight.

3. The display device according to claim 1, wherein an orthographic projection of the display region of the display liquid crystal panel on the light control panel is within the light control region of the light control panel.

4. The display device according to claim 1, wherein the value of the predetermined distance is greater than or equal to twice a maximum absolute value of a bonding tolerance of the display liquid crystal panel and the light control panel in the at least one direction; and
   the bonding tolerance of the display liquid crystal panel and the light control panel is an allowable precision deviation in a case of the display liquid crystal panel and the light control panel being aligned and bonded.

5. The display device according to claim 4, wherein the at least one direction comprises a first direction and a second direction, and the first direction is different from the second direction;
   a difference between a distance between two opposite first display edges of the display region in the first direction and a distance between two opposite first light control edges of the light control region in the first direction is a first predetermined distance, and a value of the first predetermined distance is greater than or equal to twice a maximum absolute value of a bonding tolerance of the display liquid crystal panel and the light control panel in the first direction; and
   a difference between a distance between two opposite second display edges of the display region in the second direction and a distance between two opposite second light control edges of the light control region in the second direction is a second predetermined distance, and a value of the second predetermined distance is greater than or equal to twice a maximum absolute value of a bonding tolerance of the display liquid crystal panel and the light control panel in the second direction.

6. The display device according to claim 4, wherein the maximum absolute value of the bonding tolerance of the display liquid crystal panel and the light control panel in the at least one direction is smaller than the size of each of the display pixel units in the at least one direction.

7. The display device according to claim 1, wherein the display liquid crystal panel further comprises a first light-shielding region around the display region, and
   an orthographic projection of the first light-shielding region on the light control panel at least partially overlaps with the light control region of the light control panel in the at least one direction.

8. The display device according to claim 7, wherein the light control panel comprises a light control pixel array,
   the light control pixel array is configured to adjust backlight emitted into the light control panel, so as to allow the light control panel to provide the adjusted backlight to the display liquid crystal panel, and
   the light control pixel array is at least in the light control region.

9. The display device according to claim 8, wherein the light control pixel array is in the light control region;
   the light control pixel array comprises at least one edge light control pixel unit and a middle light control pixel unit;
   the at least one edge light control pixel unit is provided along an edge of the light control region and surrounds the middle light control pixel unit; and
   a size of each of the at least one edge light control pixel unit is different from a size of the middle light control pixel unit in at least one direction.

10. The display device according to claim 8, wherein the light control panel further comprises a second light-shielding region around the light control region, and the light control pixel array comprises a plurality of light control pixel units arranged in an array; and
    the second light-shielding region at least partially shields at least one light control pixel unit at opposite edges of the light control pixel array in the at least one direction.

11. The display device according to claim 10, wherein the light control panel further comprises a first gate driving circuit;
    the first gate driving circuit is in the second light-shielding region and on at least one side of the light control region;
    the first gate driving circuit comprises a plurality of first shift register units which are cascaded, and the plurality of first shift register units are electrically connected to a plurality of rows of light control pixel units in the light control pixel array, respectively, so as to provide a first gate driving signal; and
    each of the first shift register units comprises a first transistor, and the first transistor comprises a plurality of active layers arranged side by side.

12. The display device according to claim 11, wherein the display liquid crystal panel further comprises a second gate driving circuit;
    the second gate driving circuit is in the first light-shielding region and on at least one side of the display region;
    the second gate driving circuit comprises a plurality of cascaded second shift register units, and the plurality of second shift register units are electrically connected to a plurality of rows of display pixel units in the display region, respectively, so as to provide a second gate driving signal; and a total number of respective transistors comprised in the each of the first shift register units is greater than a total number of respective transistors comprised in each of the second shift register units.

13. The display device according to claim 11, wherein in an arrangement direction of the plurality of active layers of the first transistor, a size occupied by the each of the first shift register units is smaller than a row height of one row of light control pixel units; and one first shift register unit is electrically connected to a corresponding row of light control pixel units through a signal line, and the signal line extends in a zigzag path.

14. The display device according to claim 11, wherein the each of the first shift register units comprises an input circuit, an output circuit, and an output reset circuit;

the input circuit is electrically connected to a first node and is configured to write an input signal to the first node in response to the input signal, so as to control a level of the first node;

the output circuit is electrically connected to the first node and an output terminal, and is configured to receive a clock signal and output the clock signal to the output terminal as the first gate driving signal under control of the level of the first node;

the output reset circuit is electrically connected to the output terminal and is configured to reset the output terminal in response to a reset signal; and the output circuit comprises the first transistor.

15. The display device according to claim 14, wherein the output reset circuit comprises a second transistor, and the second transistor comprises a plurality of active layers arranged side by side.

16. The display device according to claim 15, wherein a gate electrode of the first transistor is connected to the first node, a first electrode of the first transistor is connected to a clock signal terminal to receive the clock signal, and a second electrode of the first transistor is connected to the output terminal; and a gate electrode of the second transistor is connected to a reset terminal to receive the reset signal, a first electrode of the second transistor is connected to the output terminal, and a second electrode of the second transistor is connected to a first voltage terminal.

17. A manufacturing method of a display device, comprising:

providing a light control panel and a display liquid crystal panel, wherein the light control panel comprises a light control region, the light control region is configured to provide adjusted backlight to the display liquid crystal panel, the display liquid crystal panel comprises a display region, the display region is configured to receive the adjusted backlight to perform display, a distance between two opposite edges of the light control region in at least one direction is greater than a distance between two opposite edges of the display region in the at least one direction, a difference between the distance between the two opposite edges of the light control region in the at least one direction and the distance between the two opposite edges of the display region in the at least one direction is a predetermined distance, the display region comprises a plurality of display pixel units arranged in an array, and a value of the predetermined distance is greater than or equal to a size of each of the display pixel units in the at least one direction; and aligning and bonding the light control panel and the display liquid crystal panel, wherein the display liquid crystal panel is on a light-emitting side of the light control panel.

18. A light control panel, comprising a light control region, wherein the light control panel is configured to provide adjusted backlight to a display liquid crystal panel on a light-emitting side of the light control panel;

the display liquid crystal panel comprises a display region, and the display region is configured to receive the adjusted backlight to perform display;

a distance between two opposite edges of the light control region in at least one direction is greater than a distance between two opposite edges of the display region in the at least one direction;

a difference between the distance between the two opposite edges of the light control region in the at least one direction and the distance between the two opposite edges of the display region in the at least one direction is a predetermined distance; and the display region comprises a plurality of display pixel units arranged in an array, and a value of the predetermined distance is greater than or equal to a size of each of the display pixel units in the at least one direction.

19. The light control panel according to claim 18, wherein a distance between two opposite edges of the light control region in any direction is greater than a distance between two opposite edges of the display region in the any direction.

* * * * *